Feb. 27, 1945.   B. B. GEMENY   2,370,531
ELEVATOR BUCKET
Filed Aug. 24, 1942   2 Sheets-Sheet 1

Inventor
Blaine B. Gemeny
By Fred Gerlach
atty.

Feb. 27, 1945.    B. B. GEMENY    2,370,531
ELEVATOR BUCKET
Filed Aug. 24, 1942    2 Sheets-Sheet 2
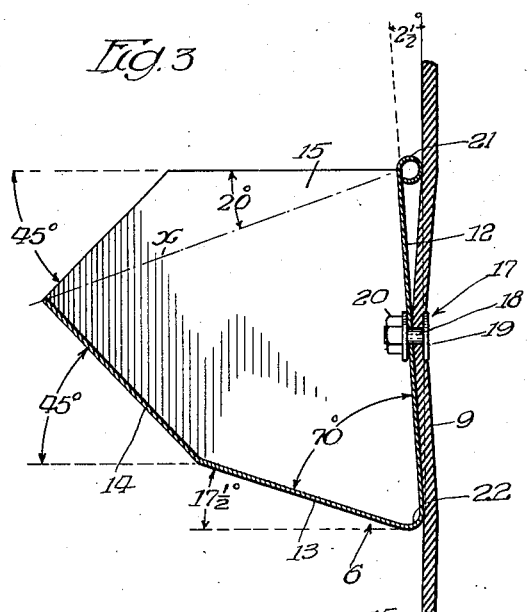
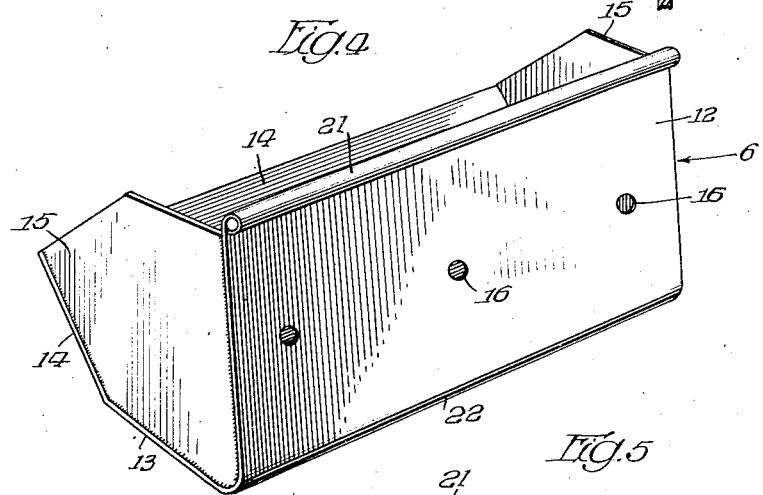
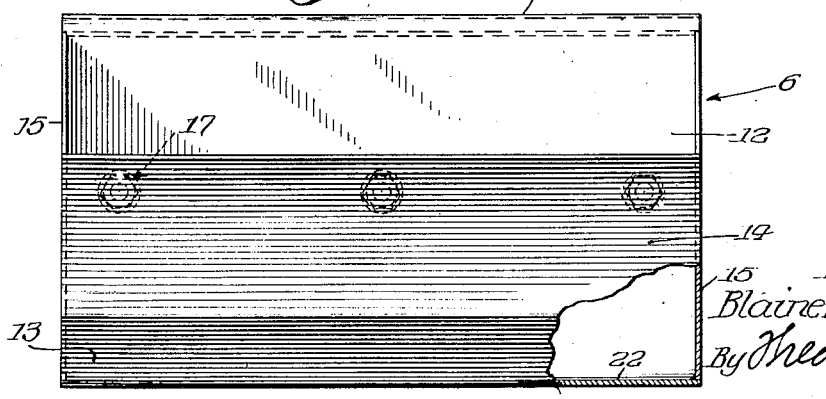
Inventor
Blaine B. Gemeny
By Fred Gerlach
Atty.

Patented Feb. 27, 1945

2,370,531

UNITED STATES PATENT OFFICE 2,370,531

ELEVATOR BUCKET

Blaine B. Gemeny, Tiffin, Ohio, assignor to Webster Manufacturing, Inc., Tiffin, Ohio, a corporation of Ohio Application August 24, 1942, Serial No. 455,845

5 Claims. (Cl. 198—152)

In general, the present invention relates to elevator buckets for use in handling or conveying granular material, such as grain. More particularly, the invention relates to that type of bucket which is formed of plate metal, comprises a back, a front, a bottom and a pair of sides, embodies means on the back thereof for attachment to an endless power driven belt around a pair of vertically aligned horizontally extending pulleys within a vertically elongated casing, and is adapted in conjunction with a plurality of like or similar buckets on the belt to form an elevator for conveying the material to be handled from the boot or lower end of the casing to a discharge spout at the head or upper end of the casing.

One object of the invention is to provide an elevator bucket of this type which is an improvement upon, and has certain advantages over, previously designed buckets, and is characterized by the fact that it is capable of being driven at high speed while fully loaded.

Another object of the invention is to provide an elevator bucket of the aforementioned type in which the bottom and front are so angularly disposed with respect to one another and the back that the material within the bucket is effectively and efficiently discharged during travel of the bucket around the upper or head pulley.

Another object of the invention is to provide an elevator bucket of the type and character under consideration in which the back is flat and embodies along its upper margin a full length rearwardly extending rounded element which serves (1) as a fulcrum medium whereby during travel of the bucket around the head pulley the lower margin of the back is urged into such firm contact with the belt that the material which is discharged from the following or trailing bucket is precluded from entering the space between the back of the bucket and the belt, (2) as a medium or instrumentality for preventing the material to be handled or conveyed from lodging between the bucket back and the belt during travel of the bucket around the lower or boot pulley, (3) to hold the bucket, especially the back thereof, in such an angular position with respect to the belt that the material, during travel of the bucket around the head pulley, is effectively discharged away from the belt, (4) to strengthen the bucket, and (5) to prevent the upper edge or margin of the bucket back from wearing or cutting the belt to any appreciable extent.

A further object of the invention is to provide an elevator bucket of the last mentioned character in which the full length rearwardly extending rounded element along the upper margin of the back of the bucket is formed by rolling or bending such margin of the bucket back into substantially cylindrical form.

A still further object of the invention is to provide an elevator bucket which may be manufactured at a low and reasonable cost and not only is durable, but also effectively and efficiently fulfills its intended purpose.

Other objects of the invention and the various advantages and characteristics of the present elevator bucket will be apparent from a consideration of the following detailed description.

The invention consists in the several novel features which are hereinafter set forth and are more particularly defined by claims at the conclusion hereof.

In the drawings which accompany and form a part of the present disclosure and in which like numerals of reference denote corresponding parts:

Figure 3 is an enlarged vertical transverse section of the bucket illustrating in detail the angular arrangement of the bottom and front with respect to one another and the bucket back;

Figure 4 is a rear perspective of the improved bucket; and

Figure 5 is a front view of the bucket, parts being broken away and other parts being shown in section for illustrative purposes.

Figure 1:
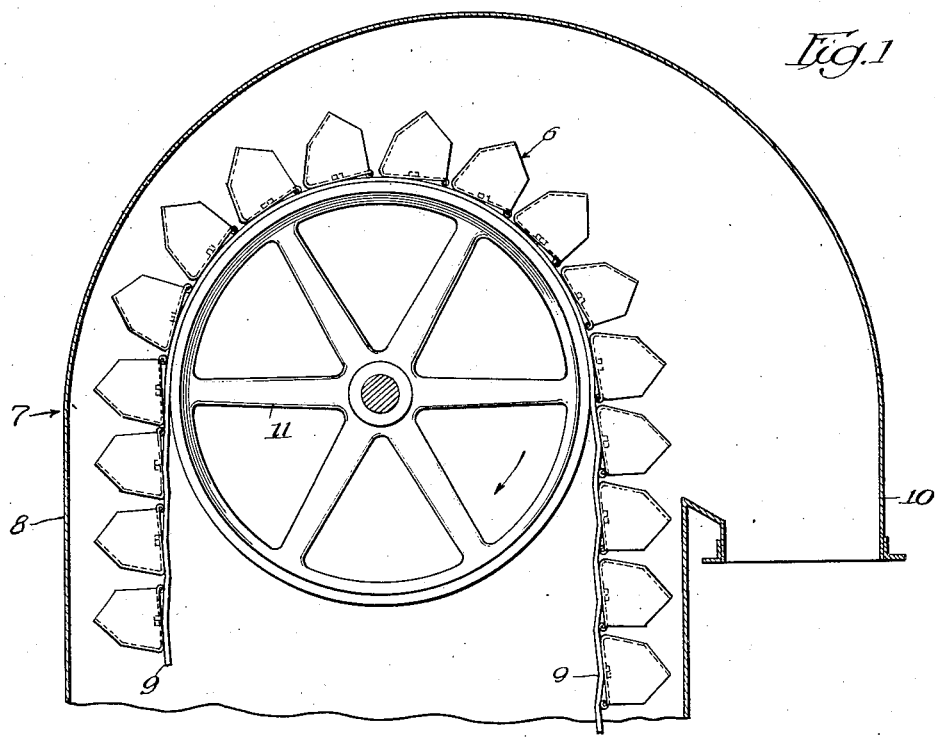
Figure 1 is a vertical section of an elevator having buckets embodying the invention.
Figure 2:
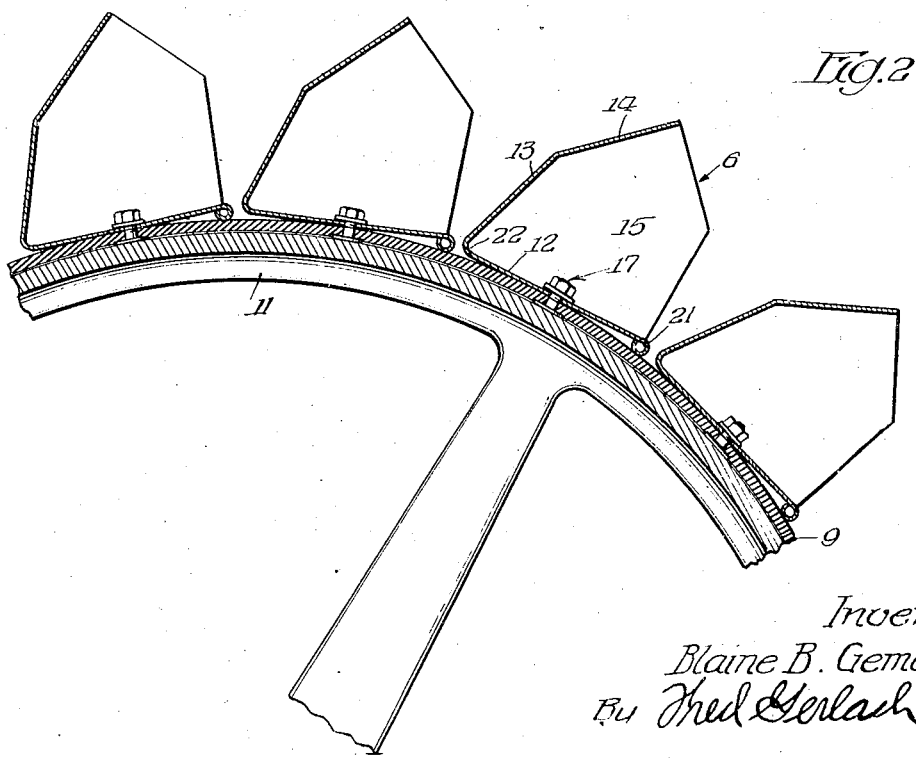
Figure 2 is a fragmentary transverse section illustrating in detail the manner in which the full length rearwardly projecting rounded element along the upper margin of the back of the improved bucket operates to urge the lower margin of the bucket into firm contact with the belt during travel of the bucket around the head pulley of the elevator.

The bucket which is illustrated in Figs. 3, 4 and 5 of the drawings constitutes the preferred form or embodiment of the invention. It is designated by the reference numeral 6, and together with a plurality of like buckets forms one of the operating parts of an elevator 7. The elevator is designed to handle or convey granular material, such as grain, and comprises in addition to the bucket 6 and the similar buckets associated therewith a vertically elongated casing 8 and an endless belt 9. Only the upper end of the casing is shown in the drawings. The lower end of the casing is of conventional design and includes a boot for receiving the material to be handled. The upper or head end of the casing is provided at the front thereof with a downwardly extending discharge spout 10. The top wall of the head end of the casing is curved or arcuate so as to direct the material after discharge thereof from the buckets into the spout 10. The endless belt 9 is in the form of a vertically elongated loop. It carries the buckets in series form and is housed or disposed within the casing. The upper end of the belt is trained around and supported by a horizontally extending head pulley 11 which, as shown in Fig. 1, is disposed in the upper or head end of the casing. The lower end of the belt is trained around a boot pulley (not shown) in the lower end or boot of the casing. The two pulleys are journaled in suitable bearings and are adapted to be driven by an electric motor or other power source so as to cause drive of the endless belt 9. The head pulley 11 is mounted or disposed above the discharge spout 10 and is arranged so that the buckets in traveling therearound pass successively by the discharge spout and discharge the material into the spout. The vertical reach of the belt that is nearer the spout travels downwards with the buckets in an inverted position and the other vertical reach, that is, the reach farther from the spout, travels upwards with the buckets in their normal position. When the elevator is in operation the buckets are charged with the material as they pass around the boot pulley in the lower end or boot of the casing. After charging the buckets travel upwards in the vertical reach that is remote from the discharge spout 10 and then pass or travel around the head pulley 11. As the buckets are inverted during travel around the head pulley the material therein is discharged by the action of gravity and centrifugal force and is deflected into and through the discharge spout. It is contemplated that the belt 9 be driven at a comparatively high rate of speed to the end that the discharged material will flow in a substantially continuous stream through the discharge spout.

The bucket 6 is formed of plate metal and consists of a back 12, a bottom 13, a front 14 and a pair of sides 15. The back, bottom and front are preferably formed of a single piece of plate metal and the two sides are formed separately and are welded in place as hereinafter described. The back 12 of the bucket 6 is flat and rectangular and embodies a plurality of holes 16. It fits against and extends transversely across the outer face of the belt 9 and is attached to the belt by bolts 17. The latter correspond in number to the holes 16 and are of conventional design in that they comprise externally threaded shanks 18, heads 19, and nuts 20. The shanks of the bolts extend through the holes 16 and aligned holes in the belt and have the heads 19 at their inner ends in abutment with the inner face of the belt. The nuts 20 are mounted on the outer end of the shanks and when tightened serve to hold the belt and the back wall of the bucket in clamped relation. The holes 16 are so positioned that the bolts are spaced laterally apart and are positioned midway between the upper and lower margins of the bucket back 12. The upper margin of the back 12 of the bucket is extended and rolled or bent rearwards and downwards to form a rearwardly projecting substantially cylindrical fulcrum element 21. This element engages the adjacent portion of the outer face of the belt 9 and serves to space the upper portion of the bucket back 12 from the belt, as clearly shown in Fig. 3. When the bucket 6 travels around the head pulley 9 the element 21 functions as a fulcrum medium or instrumentality and causes the lower margin of the bucket back firmly or snugly to engage the adjacent portion of the belt. By having the lower margin of the back in firm contact with the belt during travel of the bucket 6 around the head pulley the material which is discharged from the following or trailing bucket is precluded from becoming lodged between the back 12 of the bucket 6 and the adjacent portion of the belt. In addition to functioning as a fulcrum medium for the bucket 6 the element 21 serves materially to strengthen or reenforce the bucket and prevents the upper marginal portion of the bucket back from abrading or appreciably wearing the adjacent portion of the belt. In addition, the element 21 prevents the material to be handled from wedging between the upper margin of the bucket back and the belt during travel of the bucket 6 around the boot pulley in the lower end or boot of the elevator casing 8. As shown in Fig. 3, the thickness of the element 21 is approximately four times the thickness of the plate metal of which the back, bottom and front of the bucket is formed. Preferably the element 21 is of such thickness that it causes the bucket back 12 to be inclined upwardly and outwardly at approximately a 2½° angle with respect to the vertical when the bucket 6 is traveling in the upwardly moving vertical reach of the belt 9 (see Fig. 3). By having the back 12 of the bucket angularly positioned with respect to the belt the upper margin of the back serves in connection with discharge of the material from the bucket to direct the material away from the belt. Because the back 12 of the bucket is flat and has a rearwardly projecting rolled or curved element 21 at its upper margin the portion of the belt that is adjacent the bucket back is caused to bow outwards in the direction of the bucket and hence such portion of the belt travels readily around the head and boot pulleys of the elevator 7.

The bottom 13 of the bucket 6 extends outwardly and upwardly from the lower margin of the back 12 and has the inner margin thereof joined to the lower margin of the back by way of a quadrantal type bend 22. It is flat and extends upwardly at an angle of approximately 17½° with respect to the horizontal when the bucket 6 is traveling in the upwardly moving vertical reach of the belt. The width of the bucket bottom 13, that is the distance between the inner and outer edges of the bottom, is approximately ⅔ of the distance between the upper and lower margins of the bucket back. In other words, the width of the bucket bottom is approximately ⅔ of the height of the bucket back. The bottom 13 of the bucket extends at approximately a 70° angle with respect to the back of the bucket (see Fig. 3).

The front 14 of the bucket 6 is joined to and projects outwardly and upwardly from the outer edge of the bucket bottom 13. It is substantially the same width as the bottom 13 and extends at approximately a 45° angle with respect to the horizontal when the bucket 6 is in the upwardly moving vertical reach of the belt. It is flat and rectangular the same as the bottom 13 and has a straight outer edge.

The back, bottom and front of the bucket are the same in length and have coplanar end edges. Because of the particular angularity and arrangement of the bottom and front of the bucket the material with which the bucket is charged is caused to leave the bucket in an efficient manner during travel of the bucket around the head pulley 11. The bottom and front of the bucket cause the material during discharge thereof to move outwards away from the bucket bottom in response to the action of gravity and centrifugal force on the material. By reason of the fact that the bucket bottom 13 is disposed at an acute angle with respect to the bucket back 12, the outer face of the bucket bottom constitutes or serves as a deflecting surface for the material that is discharged by the following or trailing bucket. The outer edge of the bucket front 14 and the upper edge or margin of the back 12 of the bucket 6 lie in a plane (see dotted line X in Fig. 3) which extends downwards at approximately an angle of 20° with respect to the horizontal when the bucket is in its normal position, that is while it is in the upwardly traveling reach of the elevator belt. Because of the arrangement and location of the outer edge of the bucket front 14 the material within the bucket is effectively and efficiently discharged therefrom during travel of the bucket around the head pulley 11.

The sides 15 are located at the sides of the bucket and fit within the end edges of the bucket back, bottom and front. They are flat and imperforate, as shown in Fig. 4 of the drawings. The inner or rear edges of the bucket sides are straight and fit against the end edges of the bucket back 12. They are the same in length as the end edges of the bucket back and are welded thereto. The bottom edges of the sides are the same in length as, and are welded to, the end edges of the bucket bottom 13, and the front edges of the bucket sides are the same length as, and are welded to, the end edges of the front 14 of the bucket. The inner portions of the upper edges of the bucket sides are straight and extend truly horizontally when the bucket 6 is in its normal position. The outer portions of the upper edges of the bucket sides extend downwards at an angle of approximately 45° with respect to the horizontal. They are straight, as shown in Fig. 4, and join the ends of the outer edge of the bucket front 14. The upper portions of the two sides of the bucket project above the level of the granular material when the bucket is fully loaded and serve to prevent sidewise spilling of the material during travel of the bucket in the upwardly moving vertical reach of the belt.

The herein described elevator bucket is essentially simple in design and may be manufactured or produced at a reasonable cost. Due to its specific construction the bucket has long life and effectively and efficiently serves its intended purpose. Due to the particular angular arrangement of the bottom 13 and front 14 the bucket may be driven at a comparatively high speed and discharges the material in an extremely efficient manner. Because the upper margin of the bucket front 12 embodies the full length rearwardly rolled substantially cylindrical fulcrum element 21, the granular material is precluded from becoming lodged between the back and the adjacent portion of the belt when the bucket is traveling around the head pulley in connection with the discharge of the material and also when the bucket is traveling around the boot pulley in connection with charging the bucket.

The invention is not to be understood as restricted to the details set forth, since these may be modified within the scope of the appended claims without departing from the spirit and scope of the invention.

Having thus described the invention, what I claim as new and desire to secure by Letters Patent is:

1. A bucket adapted with like buckets to be mounted in series form on a power driven endless belt around a pair of vertically spaced pulleys and to form with said like buckets, belt and pulleys an elevator for granular material, and comprising a flat rectangular back adapted to extend transversely across the outer face of the belt, provided substantially midway between the upper and lower margins thereof with means for attachment to said belt, and having along its upper margin a full length rearwardly extending element of substantially circular cross section adapted during travel of the bucket around the upper pulley to position the back so that the lower margin thereof is in firm engagement with the belt, and a bottom connected to and extending outwardly from said lower margin of the back.

2. A plate metal bucket adapted with like buckets to be mounted in series form on a power driven endless belt around a pair of spaced apart vertically aligned pulleys and to form with said like buckets, belt and pulleys an elevator for granular material, and comprising a flat rectangular back adapted to extend transversely across the outer face of the belt, provided substantially midway between its upper and lower margins with means for attachment to said belt, and having the upper margin thereof rolled rearwards so as to form a full length substantially cylindrical fulcrum element for maintaining the back in such position that the lower margin thereof is in firm contact with the belt during travel of the bucket around the upper pulley, and a bottom connected to and extending outwardly from said lower margin of the back.

3. A bucket adapted with like buckets to be mounted in series form on a power driven endless belt around a pair of spaced apart vertically aligned pulleys and to form with said like buckets, belt and pulleys an elevator for granular material, and comprising a flat rectangular back adapted to extend transversely across the outer face of the belt, provided substantially midway between the upper and lower margins thereof with means for attachment to said belt, and having along its upper margin a rearwardly projecting full length belt engaging element of substantially circular cross section adapted during travel of the bucket around the upper pulley to position the back so that the lower margin thereof is in firm engagement with the belt, and of such thickness that it serves to hold the back at an angle of approximately 2½° with respect to the vertical when the bucket is traveling in the upwardly moving vertical reach of the belt, and a bottom connected to, and extending outwardly and upwardly from, the bottom margin of said back.

4. A bucket adapted with like buckets to be mounted in series form on a power driven endless belt around a pair of spaced apart vertically aligned pulleys and to form with said like buckets, belt and pulleys an elevator for granular material, and comprising a flat rectangular back adapted to extend transversely across the outer face of the belt, provided substantially midway between the upper and lower margins thereof with means for attachment to said belt and having along its upper margin a rearwardly extending element of substantially circular cross section adapted during travel of the bucket around the upper pulley to position the back so that the lower margin thereof is in firm engagement with the belt and of such thickness that it serves to hold the back at an angle of approximately 2½° with respect to the vertical when the bucket is traveling in the upwardly moving vertical reach of the belt, a flat rectangular bottom having its width approximately two-thirds that of the back, connected to the lower margin of, and extending outwardly and upwardly at an acute angle with respect to, said back and arranged so that it extends at approximately an angle of 17½° with respect to the horizontal when the bucket is traveling in said reach, a flat rectangular front of substantially the same width as the bottom joined to, and extending outwardly and upwardly from, the outer margin of the bottom and arranged so that it extends at approximately an angle of 45° with respect to the horizontal when the bucket is traveling in said reach, and a pair of substantially vertical sides at the end edges of the back, bottom and front.

5. A plate metal bucket adapted with like buckets to be mounted in series form on a power driven endless belt around a pair of spaced apart vertically aligned pulleys and to form with said bucket, belt and pulleys an elevator for granular material, and comprising a flat rectangular back adapted to extend transversely across the outer face of the belt, provided substantially midway between the upper and lower margins thereof with means for attachment to the belt and having the upper margin thereof rolled rearwards so as to form a full length substantially cylindrical fulcrum element for causing the back to maintain a position wherein the lower margin thereof is in firm contact with the belt during travel of the bucket around the upper pulley, a bottom connected to and extending outwardly from said lower margin of the back, a flat rectangular front joined to, and extending outwardly and upwardly from, the outer margin of the bottom and arranged so that it extends at approximately an angle of 45° with respect to the horizontal when the bucket is traveling in said reach, and a pair of substantially vertical sides at the end edges of the back, bottom and front, the outer edge of the front of the bucket and the upper edge of the bucket back lying in a plane that extends downwardly at approximately an angle of 20° with respect to the horizontal when the bucket is traveling in said upwardly moving vertical reach of the belt.

BLAINE B. GEMENY.